United States Patent
Woerdeman et al.

(10) Patent No.: US 8,535,591 B2
(45) Date of Patent: Sep. 17, 2013

(54) PROCESS FOR PREPARING BIODEGRADABLE ARTICLES

(75) Inventors: Dara L. Woerdeman, Merion, PA (US); Peter J. Joyce, Mullica Hill, NJ (US); John E. Joyce, So. Weymouth, MA (US)

(73) Assignee: Green Materials, LLC, Merion Station, PA (US)

( * ) Notice: Subject to any disclaimer, the term of this patent is extended or adjusted under 35 U.S.C. 154(b) by 8 days.

(21) Appl. No.: 11/934,704

(22) Filed: Nov. 2, 2007

(65) Prior Publication Data

US 2008/0105998 A1    May 8, 2008

Related U.S. Application Data

(60) Provisional application No. 60/864,322, filed on Nov. 3, 2006.

(51) Int. Cl.
*B27N 3/08* (2006.01)

(52) U.S. Cl.
USPC ............ 264/311; 264/319; 264/330; 425/435

(58) Field of Classification Search
USPC .......................... 264/311, 319, 330; 425/435
See application file for complete search history.

(56) References Cited

U.S. PATENT DOCUMENTS

| | | | |
|---|---|---|---|
| 2,278,858 A * | 4/1942 | Fields ........................ 425/435 |
| 2,573,685 A | 4/1947 | Blinn et al. |
| 2,543,303 A * | 2/1951 | Rubissow .................. 425/429 |
| 2,637,321 A * | 5/1953 | Cresswell ................... 606/229 |
| 3,297,802 A * | 1/1967 | Powers ....................... 264/45.7 |
| 3,420,923 A * | 1/1969 | Dunlop et al. .............. 264/420 |
| 3,752,390 A | 8/1973 | Chulay |
| 4,106,980 A * | 8/1978 | Seifert et al. ............... 162/330 |
| 4,413,771 A * | 11/1983 | Rohde et al. ................ 494/17 |
| 4,424,175 A * | 1/1984 | Neefe .......................... 264/2.1 |
| 4,788,072 A * | 11/1988 | Kawamura ................ 426/441 |
| 4,796,686 A | 1/1989 | Gayso |
| 4,978,352 A * | 12/1990 | Fedorov et al. ............ 606/166 |
| 5,164,139 A * | 11/1992 | Fujioka et al. .............. 264/86 |
| 5,279,658 A | 1/1994 | Aung |
| 5,393,215 A | 2/1995 | Donovan, Sr. |
| 5,406,059 A | 4/1995 | Nicetto |
| 5,422,057 A * | 6/1995 | Karbachsch et al. ........ 264/257 |
| 5,523,293 A | 6/1996 | Jane et al. |

(Continued)

FOREIGN PATENT DOCUMENTS

WO    WO 2004/029135 A2 *  4/2004

OTHER PUBLICATIONS

Chris Rauwendaal, "SPC Statistical Process Control in Injection Molding and Extrusion," Hanser Publications, 2000, p. 4-5, Hanser Gardner Publications, Inc., Cincinnati, OH, US.

(Continued)

*Primary Examiner* — Joseph S Del Sole
*Assistant Examiner* — Nahida Sultana
(74) *Attorney, Agent, or Firm* — Pepper Hamilton LLP (57) ABSTRACT

A process for making biodegradable articles is presented. The process comprises providing a biodegradable material. A molding assembly comprising a mold and a carrier for affixing the mold to a centrifuge is provided. The biodegradable material is inserted into the mold and the mold subjected to a centrifugal force wherein solvent is separated from the biodegradable material and the shaped article is formed.

16 Claims, 3 Drawing Sheets

(56) References Cited

U.S. PATENT DOCUMENTS

| | | | |
|---|---|---|---|
| 5,589,518 A | 12/1996 | Bastioli et al. | |
| 5,665,152 A | 9/1997 | Bassi et al. | |
| 5,888,440 A * | 3/1999 | Steinmetz | 264/255 |
| 5,998,030 A * | 12/1999 | Grimmer | 428/402 |
| 6,045,868 A | 4/2000 | Rayas et al. | |
| 6,153,239 A | 11/2000 | Thiele et al. | |
| 6,533,988 B2 * | 3/2003 | Kallio et al. | 264/503 |
| 6,620,089 B2 * | 9/2003 | Miura et al. | 494/20 |
| 6,632,525 B1 * | 10/2003 | Farrington et al. | 428/397 |
| 6,787,090 B2 * | 9/2004 | Dalton et al. | 264/255 |
| 6,808,744 B2 * | 10/2004 | Tsuji et al. | 427/183 |
| 6,841,108 B1 | 1/2005 | Savenok | |
| 6,849,113 B2 | 2/2005 | Padua et al. | |
| 6,878,199 B2 | 4/2005 | Bowden et al. | |
| 6,932,143 B2 | 8/2005 | Noble | |
| 6,983,540 B2 | 1/2006 | Kato et al. | |
| 2001/0007691 A1 * | 7/2001 | Matthews et al. | 426/516 |
| 2004/0005423 A1 * | 1/2004 | Dalton et al. | 428/36.9 |
| 2004/0010225 A1 * | 1/2004 | Schuessler | 604/96.01 |
| 2004/0049166 A1 * | 3/2004 | Chen et al. | 604/380 |
| 2004/0071786 A1 * | 4/2004 | Grippi et al. | 424/530 |
| 2004/0140048 A1 * | 7/2004 | Lindsay et al. | 156/209 |
| 2005/0214420 A1 * | 9/2005 | Schmidt et al. | 426/512 |
| 2005/0287320 A1 * | 12/2005 | Dalton et al. | 428/34.1 |
| 2006/0027941 A1 | 2/2006 | Woerdeman | |
| 2006/0036311 A1 * | 2/2006 | Nakayama et al. | 623/1.15 |
| 2008/0160157 A1 * | 7/2008 | Rutishauser et al. | 426/601 |
| 2009/0023610 A1 * | 1/2009 | Peytavi | 506/39 |
| 2009/0043398 A1 * | 2/2009 | Yakimicki et al. | 623/23.51 |
| 2009/0226557 A1 * | 9/2009 | Etayo Garralda et al. | 426/1 |
| 2010/0104691 A1 * | 4/2010 | Bouvier et al. | 426/19 |
| 2010/0234237 A1 * | 9/2010 | Yoo | 506/9 |
| 2012/0226363 A1 * | 9/2012 | Sannino | 623/23.72 |

OTHER PUBLICATIONS

Yasui et al., "Gluten Plastic, Biodegradable," Polymeric Materials Encyclopedia, 1996, p. 2830-2833, vol. 4, US.

* cited by examiner

PROCESS FOR PREPARING
BIODEGRADABLE ARTICLES

CROSS-REFERENCE TO RELATED
APPLICATIONS

This application claims the benefit of U.S. Provisional Patent Application Ser. No. 60/864,322, entitled, "Process for Preparing Biodegradable and Polymeric Articles," filed Nov. 3, 2006, which is hereby incorporated by reference in its entirety.

FIELD OF THE INVENTION

The present invention relates to molding biodegradable articles from a biodegradable material. In particular, it relates to a molding process which employs the use of an apparatus that rotates at high speed and by centrifugal force separates substances of different densities.

BACKGROUND OF THE INVENTION

The manufacture of plastic articles typically involves the use of polymer resins, solvents, and/or fillers to form materials which are molded into solid articles. There are many ways to process and produce plastic parts. The specifications and end-use requirements for a particular part dictate which manufacturing process is used. Injection, extrusion, and compression molding are currently used to process bio-based plastics. These processes require that the physical form of the feed material be solid particles (such as pellets or powder) or a liquid (molten) feed. Alternatively, solid plastic materials are ground or pulverized prior to processing. An extruder is used to form solid pellets or continuous ribbons by hot-melt compounding the polymer or plastic through shear and heater bands on the barrel. These solid pellets or continues ribbons are then used to form shaped articles. Because long heating cycles and high molding temperatures are required, there is an increased risk of thermal degradation of the polymer occurring during molding. For bio-based polymers, this risk is increased because bio-based polymers typically lack the heat resistance needed to withstand the high processing temperatures seen in injection or compression molding.

Chris Rauwendaal, "SPC Statistical Process Control in Injection Molding and Extrusion," Hanser Publications, Munich (2000), p. 4-5, describes various drawbacks associated with injection molding as including the expense of the molds, high pressures being generated within the injection molding machine, and the size of the articles being limited to no more than 1 m$^2$. In addition, the thickness of injection molded parts is limited from 0.5 mm to 5 mm. The upper thickness limit is dictated by what is considered to be a reasonable cooling time where the lower limit is set to prevent filling problems resulting from premature solidification.

Woerdeman (US Patent Application Publication No. 2006/0027941A1) sets forth the problem encountered with respect to the low temperature processing of biodegradable articles from wheat gluten dough. In particular, she addresses the problem of solvent removal by subjecting the shaped articles to an environment sufficient to remove excess water such that they are dried into solid biodegradable articles. In particular, she emphasizes the need to strike a balance between the drying of the outer portion of the shaped article and diffusion of water from the inside of the shaped article. This balance is achieved by employing low temperature, controlling the humidity in the environment, or both low temperature and low humidity conditions. If this balance is not achieved, a hard plastic shell co-existing with an uncured center portion occurs, possibly resulting in failed parts. Woerdeman's compression molding process is not suitable when short molding times are required because the dough must be cycled between the mold portions until it is dry to touch.

Yasui et al. in "Gluten Plastic, Biodegradable," *Polymeric Materials Encyclopedia*, Volume 4, pp. 2830-2833, 1996; describe the plasticization and molding of gluten. In particular, they teach that a blending temperature is preferably below 40° C. In their process, mastication takes place at 30° C. for 5 minutes. Next, the material is dried at 40° C. for 24 hours and then press molded at 50-150 kgf/cm$^2$ for 20 minutes at 120° C. resulting in a sheet film of gluten plastic. In their process, when the gluten compound was plasticized only by water and the water removed using an oven and compression molding at 130° C. for 4 minutes, a hard and brittle sample resulted that showed the independence of its elastic modulus on temperature. They found that the elastic modulus for a gluten molecule plasticized by polyol instead of water had a rubbery region at room temperature to 80° C.

Other processes typically involve high temperatures and pressures that result in modification of the chemical nature of the materials. For example, Bassi et al. (U.S. Pat. No. 5,665,152) propose the use of injection molding for a method of forming solid, non-edible biodegradable, grain protein-based articles. However, the processing temperature of up to about 80° C. results in essentially complete protein denaturation, resulting in enhanced resistance to biodegradation. Unfortunately, there is no mention of how the solvent is released from the mold during the injection process. Rayas et al. (U.S. Pat. No. 6,045,868) disclose a method wherein grain flour proteins are crosslinked with aldehydes and bleached with a bleaching agent to form crosslinked transparent polymers used as films for packaging. A heating process is preferred in order to concentrate the film-forming solution and denature the flour protein prior to crosslinking and bleaching so that more protein interactions occur when the film is dried and stronger films are formed. In particular, the preferred heating range is 60° C. up to the boiling point of the solvent. Aung (U.S. Pat. No. 5,279,658) describes a pressure injection method where hot dough is pressure injected into a form press having a water-cooled die mold. The expanded hot dough fast cools in the form press at the surface of the cold die mold. The expanded packaging material is stamped to the correct thickness in the form press. The formed packaging material may then be coated with a water repellant material, dried in an oven and cooled in a cooling chamber.

Jane et al. in U.S. Pat. No. 5,523,293 provide a thermoplastic material made of soybean protein combined with a reducing agent, a starch filler, plasticizer, water, and optional additives. The composition may be used for making solid, molded articles that are biodegradable and possess a high degree of tensile strength and water resistance. The articles are made by extrusion compounding or injection molding. More specifically, the composition is made of the reaction product of about 25-65 weight percent soybean protein alone or combined with gluten or other protein, about 0.5-2.5 weight percent reducing agent such as sodium sulfite or sodium bisulfite, about 30-40 weight percent starch filler; about 5-35 weight percent glycerol or other plasticizer, and about 5-25 weight percent water. The composition may include additives, preservatives, and/or coloring agents. The compositions are prepared by high speed, high shear mixing at an elevated temperature to melt the protein mixture, with extrusion processing being preferred. The dried extrudate is processed, for example, by injection molding, to make solid, molded articles that are biodegradable and have a high degree of tensile strength and water resistance. The high speed, high shear mixing at elevated temperatures is not desired in the present invention as such activity results in shear thinning of the material and a reduction of chain entanglements, causing the resulting articles to be brittle and weak.

In addition to injection, extrusion, and compression molding techniques, centrifugal molding is also considered to be a suitable molding technique for various materials. Centrifugal molding techniques are generally known in the art but are far less common in the plastics industry. When centrifugal molding takes place, the mold or molds in which the parts are formed are rotated at high speed and the substances of different densities within the mold or molds are separated by centrifugal force.

An object of the present invention is to provide a process for preparing biodegradable articles from a biodegradable material.

Another object of the present invention is to provide a process for preparing biodegradable articles which employs at least one mold which is subjected to a centrifugal force in order to separate solvent from the biodegradable material as the article is molded.

SUMMARY OF THE INVENTION

A process for making biodegradable articles from a biodegradable material is presented. The articles prepared by the process of the present invention are distinguished from articles prepared by traditional compression, extrusion, and injection molding processes because the biodegradable material is not subjected to direct heat. In turn, the original structure of the biodegradable material remains essentially unaltered after processing. The articles are formed from a biodegradable material, which is provided. At least one molding assembly is provided. The molding assembly comprises a mold and a carrier for affixing the mold to a centrifuge. The biodegradable material is inserted into the mold either before or after the mold is affixed to the centrifuge. The mold having the material inserted therein is subjected to a centrifugal force. The centrifugal force causes solvent to be separated from the material, and the shaped article is formed.

Additional objects and advantages of the invention will be set forth in part in the description which follows, and in part, will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principals thereof, and in which.

DETAILED DESCRIPTION OF THE PREFERRED EMBODIMENTS

The present invention is directed towards a process for making biodegradable articles from a biodegradable material using a centrifuge to mold, mix and/or to dry the material. The process of the present invention affords certain advantages over traditional molding methods such as extrusion, injection, and compression molding. Since the process invokes the use of a centrifuge, the starting raw material does not need to be in the form of a solid pellet, fine powder, or molten liquid. Instead, the starting material comprises either a solvent-containing, cohesive, deformable, biodegradable material or a mixture of a solvent and a biodegradable material. In turn, the pellitization (pellet-forming) step and the pellet melting steps traditionally required for extrusion, injection, and compression molding are eliminated. Since the process takes place using a mold secured within a centrifuge, part shrinkage is minimized. The mold/centrifuge configuration enables the part to remain under a continuous load until the part has fully solidified.

Another advantage to the process of the present invention is that the biodegradable material that is being mixed and/or molded in the centrifuge need not be subjected to direct contact with hot metal parts as found with extrusion, injection, and compression molding. This minimizes thermal damage to the biodegradable material and enables the biodegradable material to maintain a substantial portion of its original chemical structure, even after processing. The lower processing temperatures also serve to reduce energy consumption because the need to introduce heat into the process is either substantially decreased or entirely eliminated. Since lower temperatures are utilized in the process, the molds used to make various articles may be fabricated from plastic instead of metal. These plastic molds cost less than the traditional metal molds used for injection, extrusion, and compression molding.

The process of the present invention allows biodegradable articles to be formed from a biodegradable material. Any solvent that is compatible with the biodegradable material is considered to be suitable for the present invention, such as aqueous solvents, organic solvents, and water. In one embodiment of the invention, the solvent is water. The biodegradable material is defined as any bio-based material derived from renewable resources. Such materials include protein-based materials and polysaccharide-based materials. In one embodiment, the protein-based material comprises a wheat gluten-based material; a corn zein-based material; a soy protein-based material; a keratin protein-based material; a collagen-based material; and a gelatin-based material as well as various combinations of these materials. Examples of various polysaccharide-based materials include cellulose-based materials and gelatinized starch and equivalents thereof. Typically, the biodegradable material is blended with a solvent, such as water, to hydrate the biodegradable material and encourage chain entanglements which will ultimately lead to the formation of a strong, ductile article. This blending occurs either outside the mold, inside the mold, or within the mold as the biodegradable material is subjected to a centrifugal force. Once solvent has been added, and mechanical mixing (shearing or kneading) has occurred, the biodegradable material is cohesive and deformable, meaning that the material is flexible and capable of yielding to various forces as well as having the molecular attractions between particles to unite the particles together and take-on a given molded shape. Typically, the solvent and the biodegradable material are mixed to yield a homogeneous or near homogeneous mixtures. In some cases, excess solvent is present to promote flow of the material. It is understood that various additives such as fillers, plasticizers, UV stabilizers, pigments, etc. are combined with the solvent and biodegradable material to reduce cost, increase durability, and impart other desirable characteristics in the resulting articles. It is also understood that the biodegradable material is comprised of either a homogeneous material (e.g., wheat gluten-based material) or a blend of materials (e.g., wheat gluten-based material blended with corn zein-based and soy protein-based materials). In some instances, the biodegradable material contains at least 10% by weight of solvent as it must be cohesive during centrifugal molding.

Figure 1:
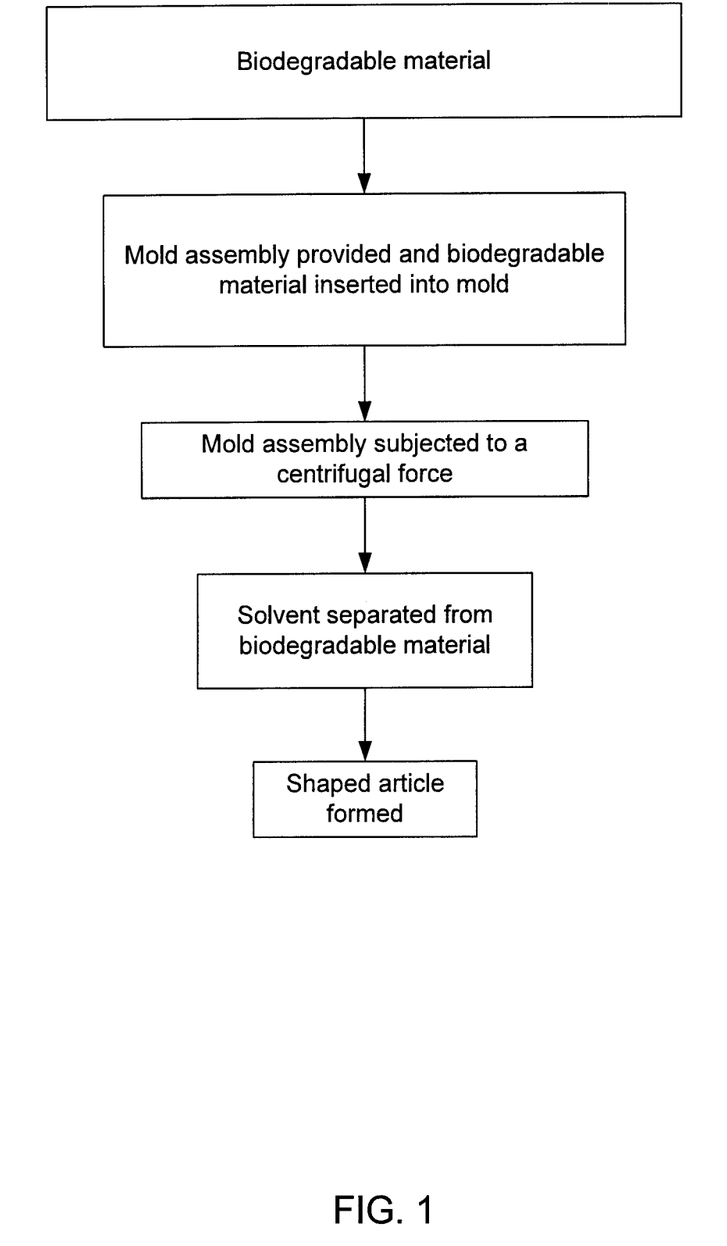
FIG. 1 is a flow chart depicting a general process for preparing a shaped article from a biodegradable material.

Referring now to FIG. 1 which is a flow chart of one embodiment of the process, a biodegradable material is provided. In order to form a shaped article, the biodegradable material must be contained within the mold during the centrifugal molding process. In practicing the process of the present invention, at least one molding assembly is provided. The molding assembly comprises a mold and a carrier for affixing the mold to a centrifuge. Any mold that will yield the desired shape for the article is suitable for the present invention. Preferably, the mold has a means for allowing solvent to escape. The mold is affixed to a centrifuge using any means known to one of skill in the art and, in some embodiments, the mold may be affixed to the centrifuge by a horizontal swinging bucket rotor. In one aspect of the present invention, the mold must be configured to allow solvent to separate and escape from the biodegradable material as a centrifugal force is simultaneously applied to the mold and the biodegradable material conforms to the shape of the mold. It is understood that the timing for insertion of the biodegradable material into the mold is interchangeable. In other words, the biodegradable material is either inserted into the mold before the mold is placed in the carrier or the biodegradable material is inserted into the mold after the mold is placed in the carrier. The importance lies in that the biodegradable material must be inserted into the mold, the mold placed in or attached to the carrier to form the molding assembly and the molding assembly ultimately affixed to a centrifuge. There are several methods for inserting the biodegradable material into the mold. These methods include but are not limited to: stamping the biodegradable material into a shape similar to that of the mold and then inserting the stamped article into the mold; forcing the biodegradable material into the mold by manually working the biodegradable material into the mold's shape; reducing the viscosity of the biodegradable material such that it is poured into the mold; injecting the biodegradable material into the mold; and placing a mixture of solvent and the biodegradable material into the mold where the centrifugal force causes the biodegradable material to sediment into the solvent as a pelleted mixture leaving excess solvent separated.

Figure 2:
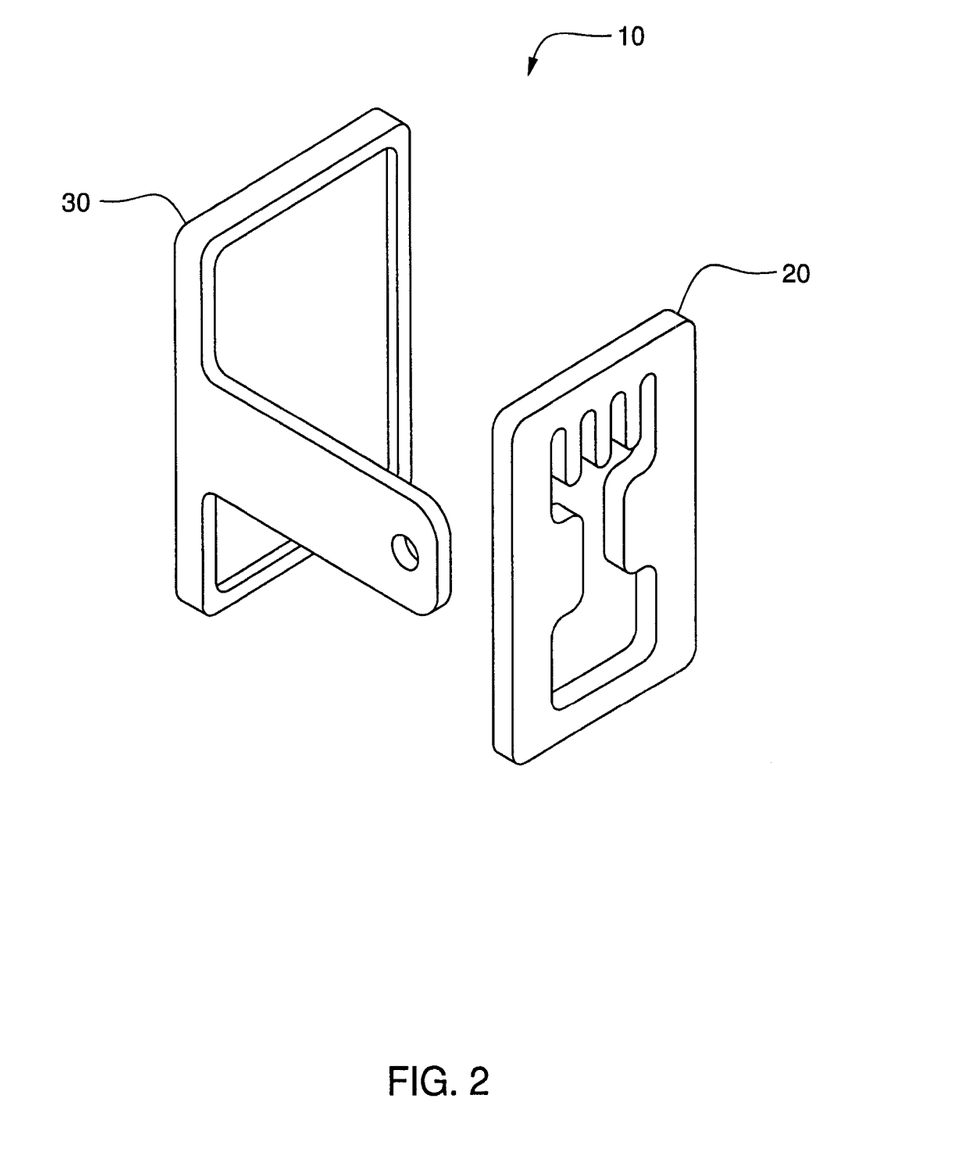
FIG. 2 is an isometric view of one embodiment of a molding apparatus.

FIG. 2 depicts one embodiment of a molding assembly 10 which is suitable for use in the process of the present invention. In the simplest embodiment, the molding assembly 10 comprises a mold 20 having the shape of the article and a carrier 30 for affixing the mold 20 to a centrifuge (not shown). FIG. 2 depicts a preferred embodiment of the mold 20 as a one-sided mold. Since the mold is one-sided solvent escapes through the open surface of the mold 20. The carrier 30 for the mold is shown in one embodiment as a removable trunnion which pivotally supports the mold, although other carrier structures are applicable.

Figure 3:
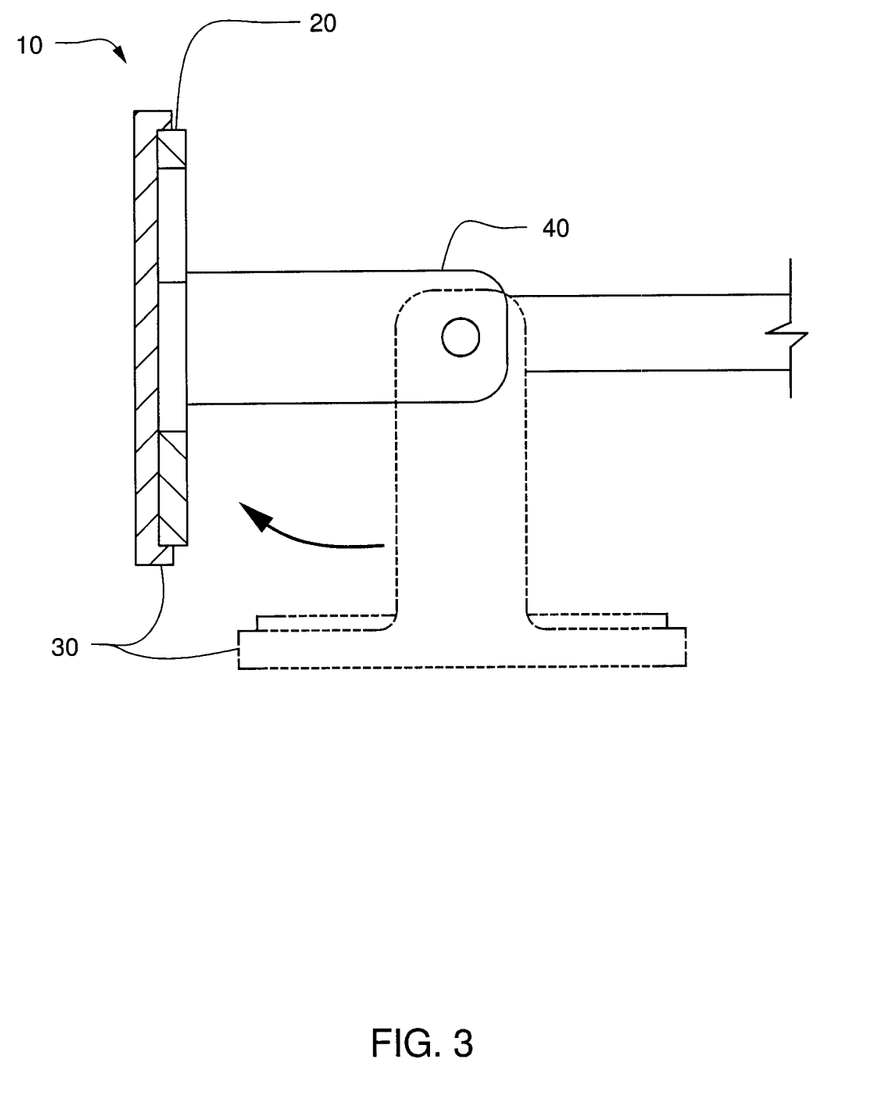
FIG. 3 is an isometric view of a second embodiment of the molding apparatus.

When the mold is two-sided, solvent escapes by various means, including but not limited to: the mold being a porous mold or having at least one pore, permits solvent to escape through the pores; the mold having at least one vent permits solvent to escape through the vent(s); and/or an insert for drawing solvent away from the material. Alternatively, when the mold is two-sided, closed, and nonporous, as the biodegradable material is subjected to a centrifugal force, solvent separates and collects on the surface of the part. This creates the need to further separate solvent from the surface of the article using standard known techniques. In one embodiment of the present invention, once the biodegradable material is inserted into the mold 20, a membrane (not shown) is placed over the mold 20 and a mold cover (not shown) is seated in place over the membrane. This process preferably takes place prior to placement of the molding assembly 10 into a centrifuge but, alternatively, may take place after. When a membrane is used, it serves as a means to move solvent away from the biodegradable material. Examples of various membranes include a bleeder fabric ply and a porous film. However, more generally, the means is any means known to one of ordinary skill in the art which enables solvent to escape from the mold. Examples of such means include but are not limited to such things as an open portion within the mold (such as at the top, side, or bottom of the mold); the mold being of a porous material wherein solvent escapes through the mold; an insert capable of wicking solvent away from the pliable, cohesive material such as a permeable film or membrane; a cover surrounding the pliable, cohesive material; and equivalents thereof. FIG. 3 depicts an embodiment of the molding assembly 10 when employing the process of the present invention. In this embodiment, the mold 20 is inserted into a carrier 30 which supports and orients the mold 20 within the centrifuge. The carrier 30 is any carrier known to one of ordinary skill in the art, such as: a fixed support, a removable centrifuge carrier, a fixed trunnion, or a removable trunnion. FIG. 3 shows the molding assembly 10 may be hinged 40 enabling the mold 20 position to be changed from horizontal to vertical or vice-versa once the molding assembly 10 is placed in a centrifuge (not shown). In some embodiments, the molding assembly 10 may be initially in a horizontal position within the centrifuge. As the centrifuge spins, the assembly 10 is lifted to a vertical position as indicated by the arrow.

The centrifuge used for practicing the present invention is any centrifuge known to one of ordinary skill in the art. Preferably, the rotor employed in the present invention is a swinging bucket rotor, although other rotors (e.g., fixed angle rotors) are also suitable. Swinging bucket rotors are characterized by a central hub portion having arms radiating outwardly. The radially outward ends of the arms comprise a support portion adapted to receive support pins from the trunnion on which the molds are supported. As an additional embodiment of the invention, a gas is introduced into the centrifuge to encourage the release of solvent from the biodegradable material as the mold containing the biodegradable material is subjected to a centrifugal force. The gas introduced into the centrifuge includes air and the inert gases, such as nitrogen or argon.

As yet another embodiment of the invention, a mechanical force is applied to the mold in addition to the centrifugal force. The force applied causes the biodegradable material to conform to the shape of the mold, forming the shaped article. Mechanical force includes but is not limited to: compressive force, injection motion, and/or a piston motion.

A further embodiment of the invention comprises exposing the mold having the biodegradable material contained within it, either as a mixture or a cohesive material, to a centrifugal force in a controlled temperature, pressure, and humidity environment. Although the temperature, pressure and humidity may be static, these conditions may also be dynamic in that the temperature, pressure, and humidity are varied on a predetermined cycle while the mold is subjected to a centrifugal force.

In another embodiment of the invention, the mold having the material contained within it is exposed to microwave energy under vacuum. This allows removal of water without cooking the material as it is exposed to microwaves.

Although not required, as a further step to the process, the article is removed from the mold. Depending on the requirements for the article, the resulting article may remain in the mold, hence the mold becomes a part of the article forming a composite, or the article is demolded. In some instances, once the article is removed from the mold, it may be desirable to dry the article further. Typical drying methods are well known and include but are not limited to: drying under ambient conditions; oven drying; drying in an inert atmosphere; freeze drying; and drying with air.

As mentioned earlier, the articles resulting from this process maintain a substantial portion of its original chemical structure, even after processing. Thermal damage to the biodegradable material is minimized due to low processing temperatures. Lower processing temperatures also serve to minimize energy consumption because the need to introduce heat into the process is essentially eliminated. Various articles are prepared from this process. These articles include but are not limited to: food storage containers; food utensils; food serviceware; beverage containers; boxes; packaging; toys; biological dressings; medical implants; biodegradable screws; surgical supplies; filters; biodegradable insulation; flower pots; food equipment; pharmaceutical equipment; and building materials.

EXAMPLES

Example 1

Plastic molds were prepared to the following dimensions:

| Sample Number | Shape | Dimensions | Structure |
|---|---|---|---|
| No. 1 | Bar | 0.6 cm wide by 3 cm long | rigid polypropylene |
| No. 2 | Oval | approximately 1.5 cm wide by approximately 2.3 cm long | porous polypropylene |

The molds were made to be held in a six position trunnion (swinging bucket type mold holder) and rotor, the design of which is shown in FIG. 3. Porous polypropylene molds allowed water to evaporate from both the surface and the backside of the mold. The apparatus (rotor, trunnion, mold holders and specimen) was fitted to run in an IEC Model No. HN-SII bench-top centrifuge. A dry air purge was fitted to feed 30 L/min of dry air through the chamber resulting in one air change every minute. A standard glass rotometer (Cole Parmer No. C-32047-68) measured the feed air rate. The outlet temperature and relative humidity were measured with an Onset MAN-S-THA Temperature/RH smart sensor connected to a HOBO weather station data acquisition unit connected through a serial port to a personal computer for direct readout on the screen.

Example 2

Wheat gluten dough was made up to 52.3% water by adding 10.095 grams of water to 10.00 grams of gluten powder and kneading the dough by hand for 10 minutes to a uniform consistency. Two specimens of 0.82 grams of the dough were put in the No. 1 mold holders and specimens of 0.75 and 0.76 grams were put in No. 2 mold holders. These pairs of specimens were placed in diametrically opposite rotor positions to maintain a balanced operating condition. The other two positions on the trunnion were empty. The trunnion and rotor were attached to the centrifuge. The centrifuge was started at 5200 RPM and generated approximately 3,200 g's. The room temperature was 29.1° C. and the humidity in the centrifugal chamber was measured at 53% RH. As the experiment was started and air was purged through the chamber, the humidity fell at a steady rate and reached a relatively stable level of 33% RH at 30.1° C. outlet temperature. After ½ hour, the centrifuge was stopped and the specimens were inspected. The two bar specimens showed a hard crust on the top layer with a soft-dough-like underside. One of the bar specimens was taken out and "flipped" over in the mold. Note: The step of "flipping" the specimens was carried out manually in this experiment, but it can also be performed in an automated fashion. This also enabled inspection of the specimens during the course of the experiments. The oval specimens from the porous polypropylene mold showed a much harder crust and the surface was more rigid but not yet hard. The centrifuge and air were turned back on for 2.5 hours. After approximately 20 minutes the humidity fell to a constant 27% RH and an outlet temperature of 31° C. After an additional 2 hours at 4200 RPM, the specimens were removed and weighed. The bar specimens were both easy to remove and weigh—each weighing 0.57 and 0.59 grams, respectively for a weight loss of 30.5% and 28.0% or remaining water percentages of 31.3% and 33.7% respectively. The first oval specimen was very difficult to remove from the mold and the specimen weight was not indicative of all of the gluten put into the mold (it was contaminated with some of the mold). This specimen was pronounced "void". The second porous specimen was removed and weighed 0.45 grams, yielding a weight loss of 40.0% and 20.4% remaining water. All of the mass balance data is shown in Table 1 and the water loss data is shown in Table 2.

TABLE 1

Mass Balance Data

| Weight (g) | Start | After Centrifuge | 24 hours | 48 hours | 72 hours |
|---|---|---|---|---|---|
| Bar-1 | 0.82 | 0.57 | 0.44 | 0.43 | 0.43 |
| Bar-2 | 0.82 | 0.59 | 0.44 | 0.43 | 0.43 |
| PP Oval | 0.75 | 0.45 | 0.39 | 0.39 | 0.39 |

TABLE 2

% Water Left in Sample

| | | | |
|---|---|---|---|
| Bar-1 | 52.3% | 31.3% | 11.0% |
| Bar-2 | 52.3% | 33.7% | 11.0% |
| PP Oval | 52.3% | 20.4% | 8.2% |

Example 3

Three remaining specimens were left out on the bench overnight to cure. After 20 more hours at about 28° C. they showed additional water loss, coming down to 11.0% residual water content for the bar specimens and 8.2% for the oval specimen. All three were quite hard and indicative of materials that could be made into a bio-based material.

Example 4

Forks Molded in a Damon/IEC Centrifuge

Approximately 13.10 g of dry wheat gluten powder was mixed with deionized water to provide a final weight of approximately 26.12 g. The mixture was kneaded for approximately 30 seconds until a dough was formed. The dough was divided into cups designed to allow the dough to flow into the molds. The dough was too viscous to flow through holes in the cups, so the cups were removed from the centrifuge. The centrifuge was set at a speed of approximately 2530 rpm ("full speed"). The dough was so viscous that chunks of the dough were placed into each of the molds. Manual manipulation was difficult. The estimated G-forces were 1500. Parts were flipped manually and re-centrifuged over a period of a few hours. Gluten dough specimens immediately formed a dry "skin" at the surface, but remained soft inside. The parts hardened on the lab bench.

Example 5

Test of Alternative Method for Getting Viscous Gluten Dough into the Mold

A "cookie cutter" (or a rubber die) was used to stamp out the shape of the part prior to insertion into a centrifuge mold cavity. A heart-shaped cookie cutter was used to stamp out heart-shaped parts from hydrated sheets of hydrated gluten dough. Gluten powder was first combined with water to make a gluten dough comprising roughly 60% water by weight. The dough was then flattened out manually, placed under a 1-2 lb board, and stored in the refrigerator for several hours. The time in the refrigerator gives the gluten chains time to undergo molecular relaxation, and also allows for cracks and other defects in the gluten dough to undergo self-repair or "self-healing".

Example 6

Study of Oxidation at the Surface of the Gluten Dough

Skinning or oxidation at the surface of the gluten dough was presumed to be preventing the water in the bulk material from evaporating. Skinning at the surface of the gluten dough specimens is thought to be a result of increased crosslinking at the surface of the parts. Skinning can be controlled by drying the parts in an oxygen-free environment such as in the presence of an inert gas such as nitrogen.

Example 7

Reduction of Shrinkage During Drying

In order to reduce the amount of shrinkage of the part during drying, forks prepared from the wheat gluten dough were moved from the centrifuge (where the air temperature was approximately 100° F.) to the refrigerator (in between centrifuge runs) and back to the centrifuge. The forks did not shrivel during drying, however, specimens did show evidence of cracking around the edges. The cycling between the freezer and the centrifuge may have been a cause of this, especially since the dough immediately formed a skin layer in the centrifuge. Forks were left out on the lab bench over the weekend. The forks were hard, but the specimens were not yet stiff. There were also some bubbles in the parts. One fork was coated with a glossy coating provided by Polymer Phases, Inc.

Example 8

Molding using Value Recovery equipment: IEC Centrifuge

Two empty fork molds were provided, each having an approximate weight of 65.8 g and 65.3-65.4 g. A dough was prepared from Belgian wheat gluten (Amylum 110). The dough was combined with roughly 60% water and kneaded for approximately 30 seconds. The weight of the mold plus a small quantity of Belgian wheat gluten dough was 69.1 g and 69.0 g. A small amount of dough was placed in the bottom part of each mold (in the square handle area).

Cycle 1: Timer set for 10 minutes and the centrifuge RPM was just above 2000. Over time, the RPM drifted to 2100. The tops of both specimens were dry and had successfully assumed the shape of the mold. It was easy to remove the parts from the mold (no sticking).

Cycle 2: The parts were flipped and re-subjected to centrifugal force for 20 minutes. The centrifuge speed was approximately 2200 RPM. The specimens were flipped and the centrifuge was restarted.

Cycle 3: The aforementioned cycles were repeated again for approximately 20 minutes. The centrifuge speed was approximately 2500 RPM after 15 minutes. The mold cavities in the rectangular regions of the molds were now completely filled. The parts were in the shapes of the molds. Gluten parts were flipped and left out in air for approximately 4.5 hours. After 4.5 hours, the parts had shrunk, pulled away from the side of the mold, and formed a skin layer. Note: Shrinkage will not occur if the mold remains under a continuous load. The reason that this occurred was because the centrifuge had been turned off. The skin layer formed because the gluten dough had been left out in air, but there are ways to avoid this from happening.

Cycle 4: The molds (and parts) were returned to the centrifuge for 10 min. The centrifuge speed was about 2500 RPM. The gluten dough specimens spread out some, but not completely. Note: There are a number of ways to get the gluten dough to conform to the shape of the mold—e.g., by lowering the viscosity of the starting material; increasing the centrifuge speed; inserting the gluten dough into the mold before drying starts, using a stamping method; or by simply allowing the centrifuge to run uninterrupted.

Cycle 5: Specimens were flipped and put back into centrifuge for 10 min. The centrifuge speed was up around 2400-2500 RPM and at 2500 RPM, 5 minutes later. Both sides had beige, smooth skin layer, but parts were still flexible. Afterwards, the specimens were removed from the molds and placed between the flat sides of the two molds under a weight (ceramic bowl) and left them to stand overnight. The mechanical load from gluten specimens was removed. The surfaces were tacky, suggesting that the "skinning" that occurs in the presence of air is at least to some extent reversible. The water had redistributed within the parts and the parts were thinner and flatter (as a result of being under the mechanical load for several hours).

Cycle 6: Parts were centrifuged again for 15 minutes, and the centrifuge speed was around 2300 RPM.

Cycle 7: The parts were centrifuged for 15 min/centrifuge speed: 2300-2400 RPM. Specimens were removed from molds (underside still tacky) & put them back between two molds & weight as before.

Cycle 8: The parts were centrifuged again for 20 min.

Cycle 9: The parts were flipped (underside moist) and centrifuged for another 20 min. Centrifuge speed was almost 2400 rpm.

Cycle 10: The parts were flipped and centrifuged for another 20 min.

Cycle 11: The parts were flipped and centrifuged for 10 min. Centrifuge speed: 2300 RPM. One specimen in particular showed evidence of cracking along the edges. Defects along edges may be a result of the shrinkage.

Cycle 12: Centrifuged for another 10 min. Speed was above 2500 RPM. Parts are now dry along sides and edges.

Cycle 13: The parts were centrifuged for another 10 min. Afterwards, parts were almost dry (dry to the touch) but still flexible.

Cycle 14: The parts were centrifuged for another 10 min. Centrifuge speed: 2300-2400 rpm.

Cycle 15: The parts were centrifuged for another 10 min. There was some residual moisture inside the parts. The parts are no longer tacky.

Cycle 16: The parts were a bit soft on underside and still somewhat flexible. The parts were centrifuged for another 10 minutes. Afterwards, there were no observable differences. The parts have a thick skin and residual moisture appears to remain in the center of the specimens.

Weights:
1: mold+gluten part: 67.8 g
2: mold+gluten part: 67.0-1 g
The parts were placed between two molds and under a weight.

Cycle 17: The parts were centrifuged for 10 minutes only. One side was slightly sticky. Centrifuge speed: almost 2400 RPM. The parts were stiff and dry.

Example 9

Centrifuge Experiment Using IEC/Damon Centrifuge

The dough preparation was carried out as in Example 8, using American wheat gluten: MGP Lot #8154.
Weights:
1: mold+gluten dough: 74.2-74.3 g
2: mold+gluten dough: 73.8-73.9 g Cycle 1: The dough was centrifuged for 10 minutes at 2200 RPM. Afterwards, a skin had already formed on specimens. Note: Measures can be taken to control skinning, as described earlier. (There was no residual water on mold surface.) There were differences between the Belgian wheat gluten and the American wheat gluten. American wheat gluten appears to hold more water, and forms a skin layer more quickly. This could be due to the presence of more disulfide bridges in the American wheat gluten (from MGP Ingredients) relative to the Belgian wheat gluten (from Amylum, Nev.).

Cycle 2: The specimens were flipped and centrifuged for 15 min. at 2300 RPM. More skinning occurred.

Cycle 3: The specimens were flipped and centrifuged for 15 min. at 2300 RPM.

Cycle 4: The specimens were flipped and centrifuged for 15 min. at 2300 RPM.

Cycle 5: The specimens were flipped and centrifuged for 15 min. at 2300-2400 RPM.

Cycle 6: The specimens were flipped and centrifuged for 15 min. at a centrifuge speed of almost 2400 RPM.

Cycle 7: The specimens were flipped and centrifuged for 15 min. at a centrifuge speed of almost 2400 RPM.

Cycle 8: The specimens were flipped and centrifuged for 15 min. Afterwards, the specimens were left in the centrifuge for 4 hours. (The centrifuge was off, so the specimens during this period the specimens were not under any kind of load.) The specimens were checked and it was noted that the gluten dough had begun to pull back from the sides of the mold.

Note: The reason this occurred was because the specimens were not under centrifugal load during a 4 hour period. The centrifuge was turned off for logistical reasons only. What this also proves is that the centrifugal load is required in order to prevent part shrinkage from occurring. The underside of specimens was very smooth.

Cycle 9: The specimens were flipped and centrifuged for 15 min. There was evidence of skinning on both sides of specimens. The specimens were covered in plastic and placed in a refrigerator overnight.

The specimens were removed from the refrigerator. Both were now moist at the surfaces. Note: This is proof that the skin layer that forms in air can be reversed.

Cycle 10: The specimens were centrifuged for 15 min. at a centrifuge speed of 2200 RPM.

Cycle 11: The specimens were flipped and centrifuged for 15 min. at a centrifuge speed of 2200-2300 RPM.

Cycle 12: The specimens were flipped and centrifuged for 15 min. at a centrifuge speed of 2300 RPM. The specimens were partially dried.

Cycle 13: The specimens were flipped and centrifuged for 15 min. at a centrifuge speed of 2300 RPM. A skin formed on both sides of specimens. It was observed that the skin layer was thinner on one surface than the other.

The specimens were returned to the refrigerator for roughly 6 hours.

Cycle 14: The specimens were removed from the refrigerator and centrifuged for 15 min. Skin layers were observed on both surfaces. The specimens were placed in plastic bags and stored in the freezer over the weekend.

The specimens were removed from the freezer. Ice crystals had formed on the surfaces of the specimens.

Cycle 15: The specimens were centrifuged for 15 min. at a centrifuge speed of 2200 RPM.

Cycle 16: The specimens were hard on one side. The specimens were flipped and centrifuged for 15 min.

Cycle 17: The specimens were flipped and centrifuged for 15 min. at a centrifuge speed of 2300 RPM.

Cycle 18: The specimens were observed and it was noted that the specimens appeared to have shrunk some. The specimens were flipped and centrifuged for 15 min. at a centrifuge speed of 2500 RPM.

It was proposed to increase the gaps between cycles to give water more time to migrate to the closed surfaces. (Underside of dough.)

Cycle 19: The specimens were flipped and centrifuged for another 15 min. at a centrifuge speed of 2500 RPM.

The specimens continued to dry under ambient conditions on the lab bench overnight. The specimens shrunk a little, but the surfaces remained smooth.

Cycle 20: The specimens were centrifuged for another 15 min. at a centrifuge speed of 2400 RPM. The specimens were hard, but appeared to have water in them. Residual water was encapsulated by a hard shell.

The specimens were stored in the refrigerator.

Example 10

Centrifuge Experiment using IEC/Damon Centrifuge

American wheat gluten (from MGP Ingredients, Inc.) was used to conduct the experiment. This was the same batch as in Example 9. This time filled up entire fork cavity.
Mold 1+dough=86.2 g
Mold 2+dough=85.85 g Cycle 1: The dough was centrifuged for 15 min. at a centrifuge speed of 2300 RPM. The dough was rather sticky and the molds were filled quite high.

Cycle 2: The specimens were flipped and centrifuged for 15 min. at a centrifuge speed of almost 2400 RPM. It was noted that the specimens were becoming easier to handle. (Less sticky).

Cycle 3: The specimens were flipped and centrifuged for 15 min at a centrifuge speed of 2300-2400 RPM.

Cycle 4: The specimens were flipped and centrifuged for 15 min at a centrifuge speed of 2300-2400 RPM.

Cycle 5: The specimens were flipped and centrifuged for 15 min at a centrifuge speed of approximately 2400 RPM.

The specimens were left to stand in centrifuge for several hours.

The experiment was resumed. It was noted that a skin layer had formed over the surfaces of the specimens.

A small amount of excess dough was trimmed away between the prongs of each fork.

Cycle 6: The specimens were flipped and centrifuged for 15 min at a centrifuge speed of 2400-2500 RPM.

A little more material was trimmed away.
Weights of Each Mold+Specimen:
1: 81.7 g
2: 81.8 g Cycle 7: The specimens were flipped and centrifuged for 15 min at a centrifuge speed of 2400 RPM.

Molds were placed in plastic bags and stored in the refrigerator overnight.

The molds were flipped and put back in fridge.

Cycle 8: The specimens were flipped and centrifuged for 15 min at a centrifuge speed of 2400 RPM.

Cycle 9: The specimens were flipped and centrifuged for 15 minutes.

It was noted that the underside was still soft. The specimens were left to dry in the refrigerator. The specimens were placed on aluminum foil and allowed to dry in a refrigerated environment.

The specimens were flipped. The surface was still a little tacky.

Cycle 10: The specimens were centrifuged for 10 minutes. There was evidence of some shrinkage.

Cycle 11: The specimens were flipped and the prongs of each fork were covered with aluminum foil. The specimens were centrifuged again for 10 minutes.

The specimens were removed from mold. The aluminum foil remained in place. The specimens finished drying in refrigerator for practical reasons only.

Example 11

Centrifuge Experiment using IEC/Damon Centrifuge

The dough preparation was carried out as in Example 8, using American wheat gluten: MGP Lot #8154.
Mold 1+gluten dough: 80.3 g.
Mold 2+gluten dough: 79.5 g Cycle 1: The specimens were centrifuged for 15 min. at a centrifuge speed of 2300-2400 RPM.

Cycle 2: The specimens were flipped and centrifuged for 20 minutes. It was observed that the specimens not completely smooth yet. Additional work needed to be done to flatten out the specimens.

Cycle 3: The specimens were flipped and centrifuged for 15 min. at a centrifuge speed of 2400 RPM.

It was observed that a skin layer was on both sides of the specimen. As described elsewhere, the gluten dough can form a skin layer in the presence of air. But measures can be taken to control the skin layer from forming, or alternatively, the skin layer can be reversed by placing the dough in a closed mold (or in a humid environment). If the skin layer is thick enough, additional centrifuging at the same rotational speeds does not accelerate drying. (Free water in the center of the part must either be forced to the surface of the specimens, or allowed to equilibrate within the specimens in a uniform humidity environment.) Specimens were flipped, covered, and stored in the refrigerator overnight.

Took specimens out of the refrigerator and flipped again.

Cycle 4: The specimens were centrifuged for 15 min. at a centrifuge speed of 2300 RPM.

Cycle 5: The specimens were flipped and centrifuged for 15 min. at a centrifuge speed of 2200-2300 RPM. Prongs of each fork covered with aluminum foil.

After the specimens were centrifuged, they were flipped, put in plastic bags, and stored in the freezer for several days.

The fork specimens were removed from the freezer. Specimens were not completely flat. Ice had formed on the top surfaces of the specimens.

Cycle 6: The specimens were centrifuged for 15 min. at a centrifuge speed of 2300-2400 RPM. The specimens sat in the centrifuge for 4 hrs. Note: This was for practical reasons only, as the apparatus was not to be left on when no one was in the lab.

Specimens were flipped and prongs of each fork were covered with Aluminum foil.

Cycle 7: The specimens were centrifuged for 15 min. at a centrifuge speed of 2200 RPM.

Cycle 8: The specimens were flipped and centrifuged for 15 min. at a centrifuge speed of 2300 rpm.

The specimens were flipped over and left out on lab bench to harden overnight.

Example 12

Centrifuge Experiment using IEC/Damon Centrifuge

The dough preparation was carried out as in Example 8, using Belgian wheat gluten from Amylum.
Weights:
Mold 1+dough: 83.0 g
Mold 2+dough: 83.7 g Cycle 1: The dough was centrifuged for 15 min. at a centrifuge speed of 2300 RPM.

Cycle 2: The specimens were flipped and centrifuged for 15 min. at a centrifuge speed of 2400 RPM.

There was evidence of a skin layer and some small bubbles. Excess dough that did not fit into mold cavity was trimmed. (Very small amount.) Note: Dough overflow can be easily avoided by taking the necessary steps not to overfill the mold cavity. Similarly, air bubbles can be eliminated in a number of different ways. One way that entrained air in the gluten dough can be removed is by increasing the rotational speed of the centrifuge.

Cycle 3: The specimens were centrifuged for 15 min. at a centrifuge speed of 2500 RPM.
Weights:
Mold 1+dough: 79.4 g
Mold 2+dough: 78.9 g Cycle 4: The specimens were centrifuged for 15 min. at a centrifuge speed of 2500 RPM. Afterwards, the specimens were flipped and trimmed a bit more. Specimens covered and stored in refrigerator overnight.

Cycle 5: The specimens were centrifuged for 15 min. at a centrifuge speed of 2300 RPM.

The molds were inverted in the trunnions and re-centrifuged (at low speed and for just 1 minute) to remove the parts from molds. (To minimize handling of the dough.)

Cycle 6: Flipped specimens. Centrifuged for 10 minutes. Centrifuge speed: 2400 RPM.

Specimens stored in refrigerator without flipping them first. The centrifuge was used to turn over the specimens. This was achieved by inverting the molds in the trunnions and turning on the centrifuge at low speed for roughly 1 minute. The dough specimens had a tendency to stick to the polyethylene plastic "lids".

Cycle 7: The specimens were centrifuged for 15 min. at a centrifuge speed of 2400 RPM.

The centrifuge was used to remove specimens from molds.
Weights:
Mold 1+dough: 76.3 g
Mold 2+dough: 76.9 g Cycle 8: The specimens were centrifuged for 15 min. at a centrifuge speed of 2300 RPM. The specimens were flipped over and left out on the lab bench to harden overnight. Note: This was for practical reasons only, as the apparatus should not be left unattended while the experiment was still in progress.

Example 13

Centrifugal Drying in a Nitrogen Environment

Used small centrifuge: IECHN-SII centrifuge, International Equipment Company, U.S.A.
Experiment #1:
Weights:
dry powder=6.15 g
powder+water after mixing: 17.05 g
dough after kneading (for roughly 30 sec): 15.75 g
ratio of water (9.6 g) to gluten powder (6.15 g)=$1.56_1$ or [61, % water/39% powder]
weight of mold 1: 8.90 g; mold 1+dough: 11.16 g
weight of dough=2.26 g→1.379 g water/0.881 g powder
weight of mold 2: 8.96 g; mold 2+dough: 11.15 g
Nitrogen flow rate was set at 40 L/min for 3 min.→97% turnover
At full speed→centrifuge dial reading: 4500 RPM.
Nitrogen left at 40 L/min for another minute after bringing the centrifuge up to full speed.
Decreased nitrogen flow rate to 15 L/min. Centrifuge dial reading: 4700 RPM.
Turned Off Centrifuge.
Weights:
Mold 1+specimen: 10.44 g (after trimming: 10.37 g)
Mold 2+specimen: 10.45 g (after trimming: 10.37 g)
** Theoretical weight of solids in Mold 1: 9.78 g
weight of gluten debris in centrifuge: [0.11 g, 0.06 g]
Mold 1: lost 48% of the water
Flipped specimens and started centrifuge again.
Nitrogen flow rate was initially set at 15 L/min.
Nitrogen flow rate was increased to 40 L/min for 3 minutes, and at 1:49 pm, turned on centrifuge.
After several minutes, centrifuge was up to speed. At that point, the nitrogen flow rate was reduced to 15 L/min
Turned Off Centrifuge
Mold 1+specimen: 10.25 g
Mold 2+specimen: 10.25 g
Thin skin layers formed on specimens and both are light in color. Specimens removed from mold.
Experiment #2
Air only—removing just the humidity.
Weights:
dry powder: 6.15 g
after mixing: 17.55 g
after kneading: 15.75 g
Mold 1+specimen: 11.14 g
Mold 2+specimen: 11.16 g
Air purge started at 40 L/min
Centrifuge turned on. After one minute, centrifuge was up to speed. At that point, the nitrogen flow rate was decreased to 15 L/min
Mold 1+specimen: 10.44 g+gluten debris (material that came loose in centrifuge)=10.53 g
Mold 2+specimen: 10.47 g+gluten debris=10.55 g
Specimens Flipped and Trimmed.
Mold 1+specimen: 10.34 g
Mold 2+specimen: 10.36 g
Vented for 4 minutes at 40 L/min
Turned on centrifuge. Centrifuge reached full speed at 3:57 pm. At that point airflow rate was decreased to 15 L/min.
Centrifuge was turned off.
Weights:
Mold 1+specimen: 10.21 g
Mold 2+specimen: 10.22 g
(Flipped over first batch of specimens, which were not drying under ambient conditions on the lab bench.)
Specimens Were Re-Weighed.
Weights of Specimens in Nitrogen Environment:
1: 0.73 g
2: 0.75 g
Weights of Specimens in Dry Air:
1: 0.75 g
2: 0.72 g
Used Matheson Trigas Product Grade: "Extra Dry" Nitrogen in Experiment #1 & Product Grade "Dry" Air (Compressed Air) in Experiment #2.

Example 14

Centrifuge Experiments using Corn Zein (in Place of Wheat Gluten)

Corn zein from Freeman Industries, LLC, Tuckahoe, N.Y.
Experiment #1
Mixed corn zein powder (Lot #3111) with water (roughly 40/60 mixture by weight) and kneaded for approximately 3 minutes. The consistency was similar to that of hard chewing gum (cohesive, yet stringy and leathery). Clearly, not as elastic or conformable as wheat gluten.
Mold 1+specimen: 70.0 g
Mold 2+specimen: 69.3 g
Cycle 1: Centrifuged for 10 minutes. Centrifuge speed: almost 2400 RPM. 5 minutes later speed slightly above 2400 RPM.
Corn zein dough conformed to shape of mold. Underside of specimens is moist and smooth.
Cycle 2: Specimens flipped. Centrifuged for 10 minutes. Centrifuge speed almost 2500 RPM.
Cycle 3: Specimens flipped. Centrifuged for 10 minutes.
Cycle 4: Specimens flipped. Centrifuged for 10 minutes. Centrifuge speed almost 2500 RPM.
Final Weights:
Mold 1+specimen: 65.5 g
Mold 2+specimen: 65.0 g
Parts still flexible, but dry on the outside. Specimens were placed under a metal weight to prevent curling. Corn zein appears to dry at least 10× as fast as wheat gluten when the experiment is conducted under ambient conditions in the presence of air.

Experiment #2

Used same batch of corn zein powder (Lot #3111)
Weight of empty dish: 7.75 g
Weight of dish+powder: 10.4 g
Intentionally mixed powder and water for a shorter period of time (this time for roughly 30 sec) and did not knead the dough. Just mixed long enough to moisten all the powder and form a cohesive dough.
Weight of dish+corn zein dough: 14.9 g
Weights:
Mold 1+specimen: 64.5 g
Mold 2+specimen: 64.1 g
Cycle 1: Centrifuged for 10 minutes. Centrifuge speed: 2400 RPM. Top surface had a slightly grainy appearance, unlike bottom surface, which was smoother—probably due to the fact that more water was present and that the protein chains had more time to interpenetrate and form molecular-scale entanglements.
Cycle 2: Flipped specimens. Centrifuged for 10 minutes.
Top surfaces of specimens were no longer tacky after Cycle 2.
Mold 1+specimen: 63.9 g
Mold 2+specimen: 63.5 g
Cycle 3: Flipped specimens. Centrifuged for 10 minutes. Centrifuge speed: 2400 RPM.
Cycle 4: Flipped specimens. Centrifuged for 10 minutes. Centrifuge speed: 2400 RPM.
Specimens are nearly dry, but not yet stiff. Left to harden in a refrigerated environment.
Specimens were weighed using a Triple Beam 700/800 Series OHAUS Balance.

Example 15

Beckman Coulter Allegra X-15R Centrifuge

Raw material: vital wheat gluten, MGP Ingredients Lot #8154
In mixing dish: Dry wheat gluten powder: 13.07 g
wheat gluten powder+deionized water: 28.42 g
Kneaded dough for roughly 3 min
Weights in each bucket: 11.89 g
Centrifuge Conditions:
RPM=3000
RCF (xg)=2095
Temp=22° C.
Time=5 min
Acceleration & Deceleration Speeds Set at Maximum
Rotor used: SX4750 Swinging Bucket
1) After first 5 min in centrifuge, weights were each 11.34 g.
Dough began to spread out in each mold.
2) RPM set at 4000, RCF (xg)=3724, Time=10 min; Flipped dough samples and restarted centrifuge
3) Same conditions as 2) RCF (xg)=3720
After step 3), it was evident that the gluten dough had continued to spread and assume the shape of the mold.
Weight of specimens after $3^{rd}$ centrifuge step: 11.00 g
Specimens were stored in cold room (4° C.) overnight.

Example 16

Raw Material: Corn Zein from Freeman Industries, LLC (F4000 Lot #3111)

Weight of dry powder: 6.46 g
Powder+DI water: 22.05 g
Kneaded the hydrated corn zein dough for roughly 10 min. Corn zein formed a cohesive mass. Kneading appeared to promote hydrophobic/hydrophobic interactions as well as chain entanglements. Under tensile load, cohesive material exhibits stringiness.
Weights:
Corn zein sample weight in holder #4=4.36 g
Corn zein sample weight in holder #2=4.42 g
1) 10 min in centrifuge; RPM=4000; T=22° C.; accel and decel speeds=MAX
Afterwards both samples flattened out in molds. Residual water could be seen along edges.
Weights:
Corn zein sample in holder #4=4.26 g
Corn zein sample in holder #2=4.32 g
2) 10 min in centrifuge under same conditions as in 1)
Weights:
corn zein sample in holder #4=4.22 g
corn zein sample in holder #2=4.26 g Example 17

Demonstration of Two-Sided Mold Concept

Hydrophilic, flexible, porous molds were used.
Weight of molds used in holder #2: 3.10 g
Weight of molds used in holder #4: 3.18 g
Weight of molds+hydrated corn zein in holder #2=7.37 g
Weight of hydrated corn zein in holder #2=4.27 g
Weight of molds+hydrated corn zein in holder #4=7.42 g
Weight of hydrated corn zein in holder #4=4.28 g
1) 10 min in centrifuge; RPM=4000; T=22° C.; accel and decel speeds=MAX
Weight of molds+hydrated corn zein in holder #2=7.31 g
Weight of hydrated corn zein in holder #2=4.22 g
Weight of mold in holder #2=3.12 g
Weight of molds+hydrated corn zein in holder #4=7.40 g
Weight of hydrated corn zein in holder #4=4.20 g
Weight of mold in holder #4=3.21 g
Observations:
1. Overall weights (molds+specimens) decreased
2. Weights of hydrated corn zein samples decreased
3. Weights of molds increased
Hence, the general concept proved successful.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A process for making solid biodegradable articles, the process consisting essentially of:
   a) providing a solvent-containing, cohesive, deformable, biodegradable material comprising at least 10% by weight of water, but no more than 70% by weight of water, said solvent-containing, cohesive, deformable, biodegradable material prepared by mixing a solvent and a protein-based biodegradable material to form a material that is flexible and capable of yielding to various forces;
   b) providing at least one molding assembly consisting essentially of a mold and a carrier for affixing the mold to a centrifuge;
   c) inserting the solvent-containing, cohesive, deformable, biodegradable material into the mold;

d) subjecting the molding assembly having the solvent-containing, cohesive, deformable, biodegradable material inserted into the mold to a centrifugal force wherein the centrifugal force causes the solvent to escape from the solvent-containing, cohesive, deformable, biodegradable material and wherein a solid, densified, three dimensional, complex-shaped, article is formed within the mold;

wherein the mold has a means for allowing solvent to escape.

2. A process according to claim 1, wherein the protein-based material comprises a wheat gluten-based material.

3. A process according to claim 1, wherein the protein-based material comprises a corn zein-based material.

4. A process according to claim 1, wherein the protein-based material comprises a soy protein-based material.

5. A process according to claim 1, wherein the protein-based material comprises a keratin protein-based material.

6. A process according to claim 1, wherein the mold is affixed to the centrifuge by a horizontal swinging bucket rotor.

7. A process according to claim 1, wherein the means for allowing solvent to escape comprises at least one opening in the mold.

8. A process according to claim 1, wherein the mold is a one-sided mold.

9. A process according to claim 1, wherein the mold is a porous mold.

10. A process according to claim 1, wherein the means for allowing the solvent to escape comprises an insert for drawing solvent away from the material.

11. A process according to claim 1, further consisting essentially of introducing a gas into the centrifuge wherein solvent is evaporated from the solvent-containing, cohesive, deformable, biodegradable material.

12. A process according to claim 1, further consisting of applying a mechanical force to the mold in addition to the centrifugal force in a simultaneous or alternating fashion.

13. A process according to claim 1, further consisting of exposing the mold having the solvent-containing, cohesive, deformable, biodegradable material disposed therein to the centrifugal force in a controlled temperature, pressure and humidity environment.

14. A process according to claim 13, wherein the temperature, pressure and humidity are varied on a pre-determined cycle while the mold having the solvent-containing, cohesive, deformable, biodegradable material disposed therein is subjected to the centrifugal force.

15. A process according to claim 1, further consisting of exposing the mold having the solvent-containing, cohesive, deformable, biodegradable material disposed therein to microwave energy under vacuum.

16. A process according to claim 1, wherein the solvent-containing, cohesive, deformable, biodegradable material conforms to the shape of the mold.

* * * * *